United States Patent [19]

Yamamoto

[11] Patent Number: 5,782,392

[45] Date of Patent: Jul. 21, 1998

[54] ROOF RAIL STRUCTURE FOR MOTOR VEHICLE

[75] Inventor: Toshiyuki Yamamoto, Oota, Japan

[73] Assignee: Fuji Jukogyo Kabushiki Kaisha, Tokyo, Japan

[21] Appl. No.: 684,439

[22] Filed: Jul. 17, 1996

[30] Foreign Application Priority Data

Jul. 20, 1995 [JP] Japan .................................. 7-206512

[51] Int. Cl.$^6$ ............................................... B60R 9/00
[52] U.S. Cl. .................... 224/326; 224/309; 224/319; 224/321; 224/324; 224/325; 224/326
[58] Field of Search ................................ 224/309, 319, 224/321, 324–326, 328–331, 314, 322, 917.5, 924

[56] References Cited

U.S. PATENT DOCUMENTS

| | | | |
|---|---|---|---|
| 4,684,048 | 8/1987 | Bott | 224/326 |
| 5,133,490 | 7/1992 | Cucheran | 224/321 |
| 5,476,201 | 12/1995 | Hall et al. | 224/924 |
| 5,615,818 | 4/1997 | Linden | 224/326 |

*Primary Examiner*—Henry J. Recla
*Assistant Examiner*—Timothy L. Maust
*Attorney, Agent, or Firm*—Beveridge, DeGrandi, Weilacher & Young LLP

[57] ABSTRACT

In a vehicle having a roof groove, which extends in the longitudinal direction along each side of its roof panel, and a roof rail attached to the roof groove, the number of components for attaching the roof rail can be reduced to facilitate the mounting operation for the rail.

The roof rail (1) is formed integrally from a synthetic resin, comprising a rail body (2), front and rear end legs (3) protruding downward from the rail body, an intermediate leg (4), and a molding unit (5) connecting the respective lower end portions of the legs (3, 4) together. The molding unit (5) includes a cover section (5a) covering the top of the roof groove (8) and a ridge (5b) fitted in the groove (8). The respective heads of fixing bolts (9) are fixedly embedded in suitable positions in the bottom portion of the ridge (5b). The roof rail (1) is attached to the roof groove (8) by inserting the fixing bolts (9) individually into mounting holes (8a) in the base of the groove (8) and tightening the bolts (9) by means of nuts (10) from the inside of the vehicle.

8 Claims, 4 Drawing Sheets

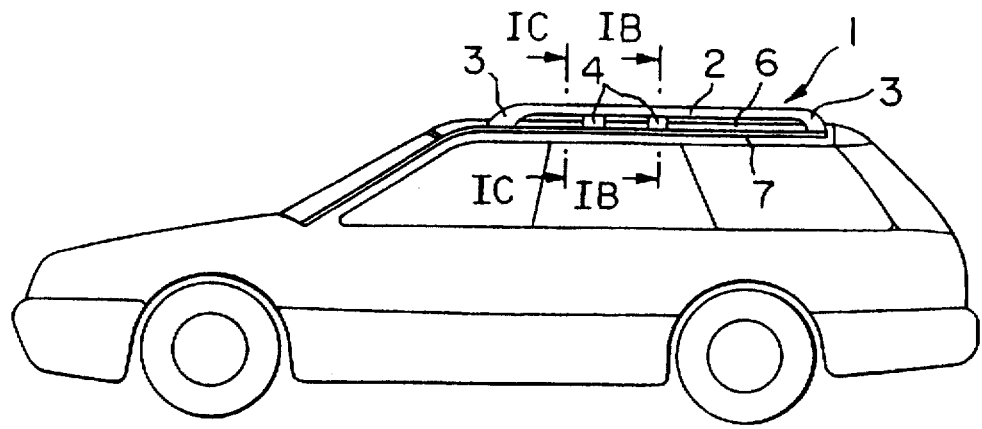
FIG. IA
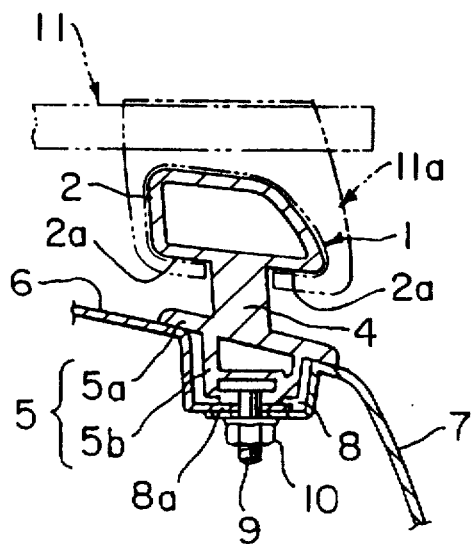
FIG. IB
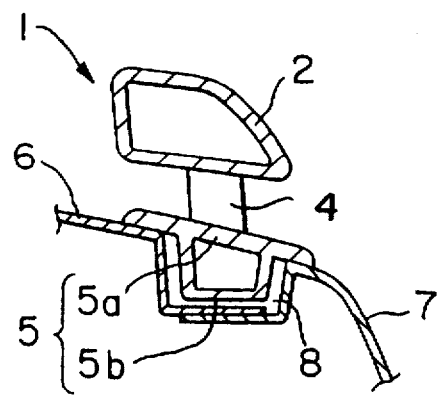
FIG. IC

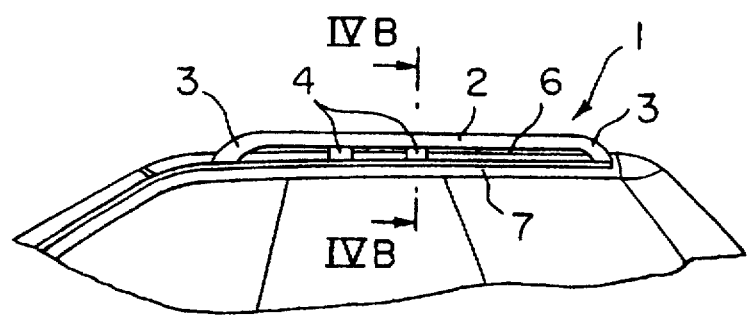
F I G. 4 A
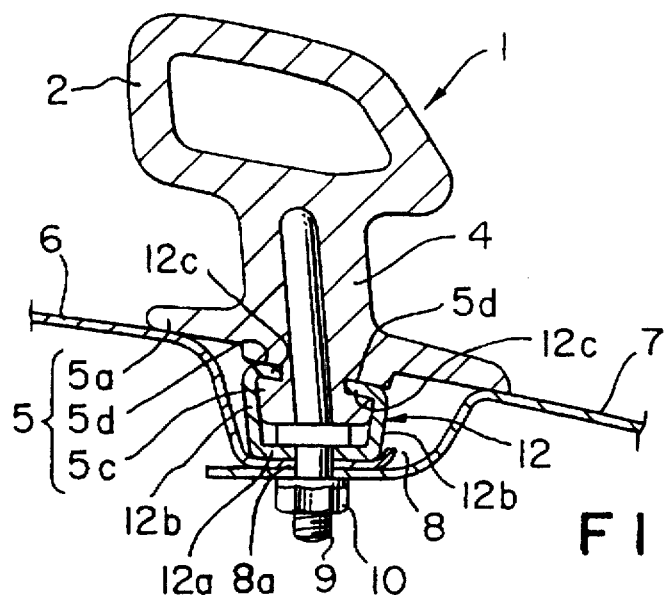
F I G. 4 B
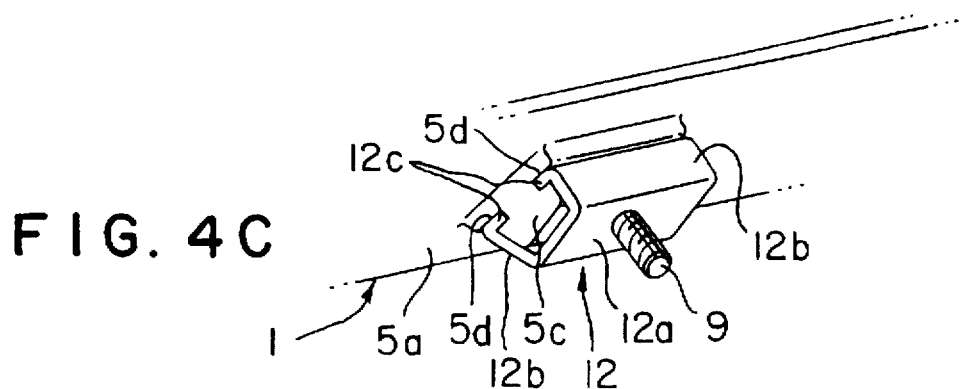
F I G. 4 C

ROOF RAIL STRUCTURE FOR MOTOR VEHICLE

BACKGROUND OF THE INVENTION

1. Field of the Invention

The present invention relates to a roof rail attached to each side of the roof panel of a vehicle so as to extend in the longitudinal direction thereof.

2. Information of the Related Art

In various conventional vehicles having roof moldings, such as the one disclosed in Jpn. UM Appln. KOKAI Publications Nos. 59-13344 and 5-64068, a roof groove is formed extending in the longitudinal direction of the vehicle along each side edge of the roof panel thereof by depressing a junction point between each side portion of the roof panel and its corresponding side panel, and a roof molding is attached to the roof groove. Front and rear legs of a roof rail are fixed to the roof groove by means of bolts and nuts.

In the conventional arrangement described above, the roof molding and the roof rail are formed as a separate component. In attaching the roof rail to the roof groove, the legs of the rail are fitted into the groove through notches, which are formed by partially cutting the roof molding that covers the groove, and are fixed by means of the bolts and nuts.

Since the conventional roof rail is formed and attached independently to the roof molding, the mounting operation is troublesome and time-consuming. Moreover, seams between the rail legs and the end edges of the notches in the molding cannot be easily concealed, and sometimes spoil the appearance of the roof rail.

SUMMARY OF THE INVENTION

The object of the present invention is to provide a roof rail capable of solving the aforementioned problems.

According to the present invention, there is provided a vehicle roof rail, which is formed integrally from a synthetic resin and attached to a roof groove extending in the longitudinal direction of the vehicle body along each side of a roof panel of the vehicle, the roof rail comprising a rail body, a plurality of legs protruding downward from the underside of the rail body, and a molding unit continuously covering the roof groove when the roof rail is attached in position.

Since the roof molding is formed integrally with the roof rail, as described above, the number of components can be reduced, and the molding and the rail can be attached simultaneously. Thus, the efficiency of the mounting operation can be improved considerably. Also, there is no seam between the legs of the roof rail and the roof molding that may spoil the appearance of the rail. Thus, a low-cost roof rail can be provided with an excellent appearance and easy handling.

BRIEF DESCRIPTION OF THE DRAWINGS

FIG. 1A is a side view showing an example of a vehicle furnished with a roof rail according to a first embodiment of the present invention;

FIG. 1B is a sectional view taken along line IB—IB of FIG. 1A;

FIG. 1C is a sectional view taken along line IC—IC of FIG. 1A;

FIG. 4A is a side view showing an example of a vehicle furnished with a roof rail according to a fourth embodiment of the present invention;

FIG. 4B is a sectional view taken along line IVB—IVB of FIG. 4A; and

FIG. 4C is a perspective view showing a bracket mounted on a bulge.

DETAILED DESCRIPTION OF THE PREFERRED EMBODIMENTS

Figure 2A:
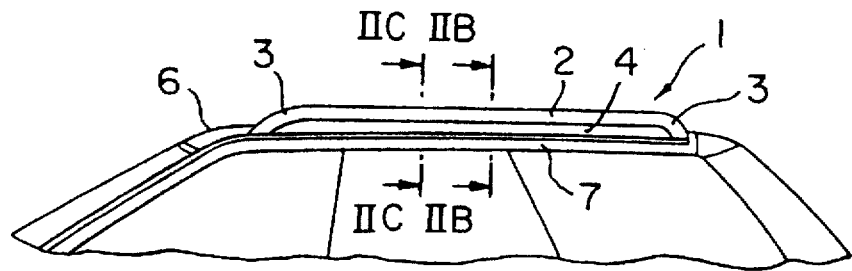
FIG. 2A is a side view showing an example of a vehicle furnished with a roof rail according to a second embodiment of the present invention.

Preferred embodiments of the present invention will become understood from the following detailed description referring to the accompanying drawings.

FIGS. 1A, 1B and 1C show a first embodiment of the invention, in which FIG. 1A is a side view of a vehicle furnished with a roof rail according to the first embodiment. In FIG. 1A, numeral 1 denotes a roof rail attached to a roof groove 8, which is formed extending along each side of a roof panel 6.

As shown in FIGS. 1B and 1C, the roof rail 1 is an integral structure of a synthetic resin, comprising a rail body 2, legs 3 at the front and rear ends of the rail body 2, intermediate legs 4 in suitable positions between the legs 3, and a molding unit 5 formed so as to connect the respective lower portions of the legs 3 and 4 together.

The molding unit 5 includes a cover section 5a covering the top of the roof groove 8 and a ridge 5b having a substantially square cross section and tightly fitted in the groove 8. The head of each fixing bolt 9 is embedded in the bottom portion of the ridge 5b so that the bolt 9 projects downward from the underside of the ridge. In the present embodiment, the fixing bolts 9 are fixed right under the respective centers of the legs 3 and 4.

The width of the upper end portion of each intermediate leg 4 is narrower than that of the bottom portion of the rail body 2. Thus, hook portions 2a are formed on the underside of the rail body 2, on either side of the upper end of each leg 4, whereby a mounting clamp 11a of a roof carrier 11 is caught.

Preferably, the rail body 2 and the ridge 5b should be hollow structures that ensure reduction in weight.

As in the conventional case, the roof groove 8 is formed extending in the longitudinal direction of the vehicle body by depressing the junction portion between each side end portion of the roof panel 6 and its corresponding side panel 7. The welded junction portion between the roof panel 6 and the side panel 7 constitutes the base of the roof groove 8.

The roof rail 1, an integral resin structure formed in this manner, can be attached to the roof groove 8 by fitting the ridge 5b of its molding unit 5 into the groove 8, inserting the fixing bolts 9 individually into mounting holes 8a in the base of the groove 8, and tightening the bolts 9 by means of nuts 10 from the inside of the vehicle.

With the roof rail 1 attached in this manner, the ridge 5b of the molding unit 5 fills the roof groove 8, and the opposite side portions of the cover section 5a are elastically in contact with the respective top faces of the roof panel 6 and the side panel 7 on either side of the roof groove 8 so that they continuously cover the groove 8.

Since the roof molding is thus formed integrally with the roof rail, the number of components can be reduced. Also, the molding and the rail can be attached simultaneously by a very simple operation such that the ridge 5b of the molding unit 5 is fitted into the roof groove 8 and the nuts 10 are screwed tight on the fixing bolts 9, individually. Thus, the efficiency of mounting operation can be improved considerably. Since the roof rail and the roof molding are formed integrally, moreover, there is no seam therebetween that may spoil the appearance of the roof rail. Furthermore, it is easy to rope the rail body 2 or clamp the roof carrier to the body 2, so that the roof rail is good in handleability.

Figure 2B:
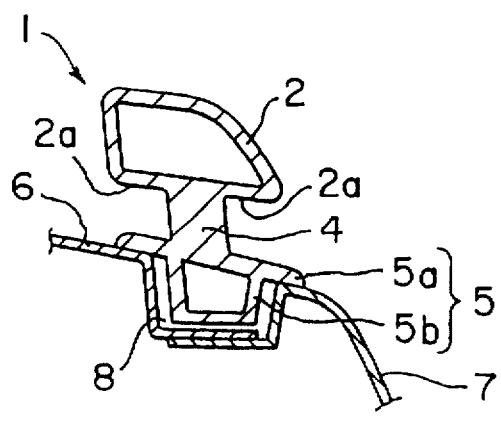
FIG. 2B is a sectional view taken along line IIB—IIB of FIG. 2A.
Figure 2C:
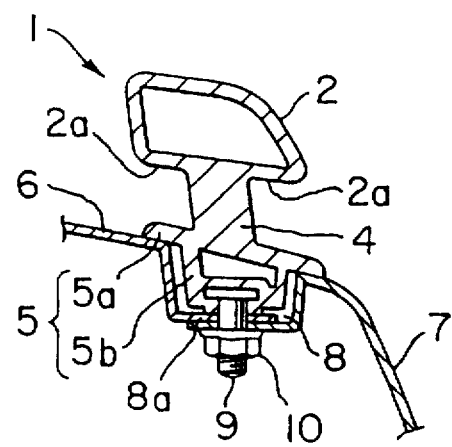
FIG. 2C is a sectional view taken along line IIC—IIC of FIG. 2A.

FIGS. 2A, 2B and 2C show a second embodiment of the present invention. While the intermediate legs 4 are partially formed between the end legs 3 at suitable distances therefrom according to the first embodiment shown in FIGS. 1A to 1C, an intermediate leg 4 according to the second embodiment shown in FIGS. 2A to 2C is continuously formed without gaps between legs 3 at the front and rear ends of the rail body 2. For other structure, method of attachment, etc., the first and second embodiments are arranged substantially in the same manner. In the description to follow, similar portions are designated by the same reference numerals throughout the drawings.

According to the second embodiment, fixing bolts 9 are located right under the respective centers of the end legs 3 and suitable positions between the centers.

According to the second embodiment, moreover, the legs 3 and 4 are continuously formed covering the whole region in the longitudinal direction of the rail body 2, so that the dead weight of a cargo on the rail body 2 is widely dispersedly supported on the vehicle body, including the legs 3 and 4, roof panel 6, side panel 7, etc. Thus, the rail body can be further reduced in weight without lessening its strength.

Figure 3A:
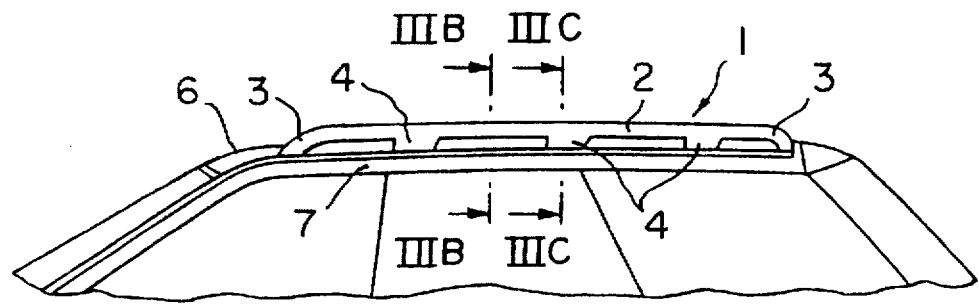
FIG. 3A is a side view showing an example of a vehicle furnished with a roof rail according to a third embodiment of the present invention.
Figure 3B:
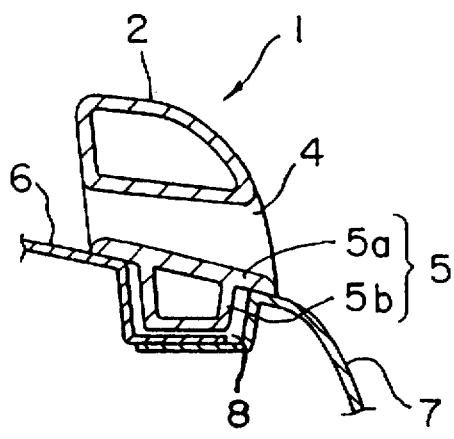
FIG. 3B is a sectional view taken along line IIIB—IIIB of FIG. 3A.
Figure 3C:
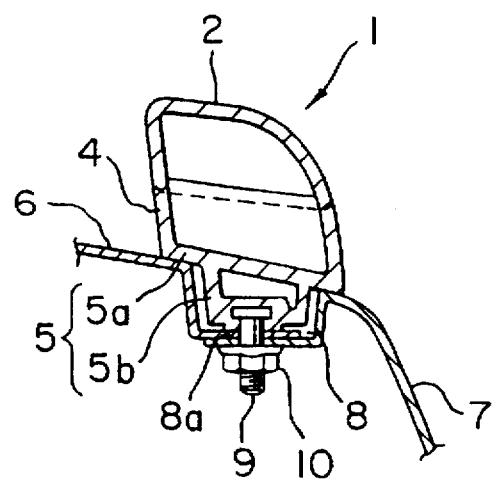
FIG. 3C is a sectional view taken along line IIIC—IIIC of FIG. 3A.

FIGS. 3A, 3B and 3C show a third embodiment of the present invention. According to the first embodiment shown in FIGS. 1A to 1C, the width of each intermediate leg 4 is made narrower than that of the bottom portion of the rail body 2, so that the hook portions 2a for the roof carrier mounting clamp are formed on the underside of the rail body 2, on either side of the upper end of each leg 4. According to the third embodiment shown in FIGS. 3A to 3C, on the other hand, a rail body 2 is not provided with any hook portions 2a, and the opposite side faces of each of intermediate legs 4 are continuous and flush with the bottom portion of the rail body 2 and a cover section 5a of a molding unit 5, so that the appearance of a roof rail 1 is improved. For other structure, method of attachment, etc., the first and third embodiments are arranged in the same manner.

According to the third embodiment, roping or clamping is carried out in any other position than the positions of the legs 3 and 4 of the rail body 2.

FIGS. 4A, 4B and 4C show a fourth embodiment of the present invention. According to this embodiment, a molding unit 5, which is a plastic structure formed integrally with a rail body 2, front and rear end legs 3, and intermediate legs 4, includes a cover section 5a covering the top of a roof groove 8 and a bulge 5c projecting into the groove 8. A longitudinal retaining groove 5d is cut in the upper portion of each side face of the bulge 5c. A roof rail 1 is attached to the roof groove 8 by fitting metallic brackets 12, separate components, into the retaining grooves 5d of the bulge 5c for longitudinal sliding motion, and tightening fixing bolts 9 by means of nuts 10 to fix the brackets 12 to the base of the groove 8. As in the cases of the first to third embodiments, the cover section 5a of the molding unit 5 is continuously formed so as to cover the whole roof groove 8 in the longitudinal direction when the roof rail 1 is attached. The bulge 5c may be continuously formed in the longitudinal direction, or a plurality of bulges 5c may be formed at intervals, as shown in FIG. 4C. In the case where the bulges 5c are arranged at intervals, they should preferably be located individually under the legs 3 and 4.

Each bracket 12 is a substantially channel-shaped structure of a suitable length, having a base 12a, a pair of side faces 12b, and engaging flange portions 12c formed by inwardly bending the respective upper edges of the side faces 12b. The base 12a is fixedly penetrated by the fixing bolt 9. In attaching the roof rail 1 to the roof groove 8 in four positions, the front and rear end portions and two intermediate positions, for example, four brackets 12 are mounted individually on the bulges 5c in such a manner such that the engaging flange portions 12c are fitted in the respective retaining grooves 5d of each bulge. When each bracket 12 is mounted in this manner, it is slidable in the longitudinal direction along the retaining grooves 5d of its corresponding bulge 5c.

The brackets 12, each having the fixing bolt 9, are fitted on the bulge or bulges 5c, the respective fixing bolts 9 of the brackets 12 are inserted individually into mounting holes 8a in the base of the roof groove 8, and are tightened by means of the nuts 10 from the inside of the vehicle. By doing this, the roof rail 1 can be attached to the roof groove 8 in such a manner such that the cover section 5a of the molding unit 5 continuously covers the groove 8.

According to the first to third embodiments, the fixing bolts 9 are fixedly embedded in the ridge 5b of the molding unit 5. According to the fourth embodiment, on the other hand, the fixing bolts 9 are fixed to the metallic brackets 12 as separate components. Although the number of components used in the arrangement of the fourth embodiment is larger than the cases of the first to third embodiments, the member is smaller than the conventional cases. Also, the roof rail and the roof molding can be attached simultaneously, so that the efficiency of mounting operation can be improved considerably. Since the roof rail and the roof molding are formed integrally, moreover, there is no seam between the rails that may spoil the appearance of the roof rail. Furthermore, it is easy to rope the rail body 2 or to clamp the roof carrier to the body 2, so that the roof rail is easy to install on the roof. Since the brackets 12 are slidable in the longitudinal direction on the bulges 5c of the roof rail 1, moreover, the fixing bolts 9 can be easily aligned with the mounting holes 8a, so that the mounting operation is easy. Also, the relative sliding motion of the brackets 12 can absorb thermal expansion and contraction of the roof rail 1 itself.

The ridge 5b according to the second and third embodiments shown in FIGS. 2 and 3 and the fixing bolts 9 fixedly embedded therein may be replaced with a combination of the bulge or bulges 5c according to the fourth embodiment and the brackets 12 slidably fitted thereon. In this case, the roof rail 1 is attached to the roof groove 8 by means of the fixing bolts 9 that are fixed to the underside of the brackets 12.

If the roof rails according to the first to fourth embodiments are formed integrally with the roof molding from a thermoplastic synthetic resin by the conventional injection molding method, the surface of each product may possibly be subject to sink marks in regions where its profile changes. The gas-injection molding method (see Jpn. Pat. Appln. No. 6-136024) can solve this problem.

According to the present invention, as described herein, the roof rail is formed integrally with the roof molding, so that the number of components can be reduced, and the efficiency of mounting operation can be improved considerably. Also, there are no seams between the legs of the roof rail and the roof molding that may spoil the appearance of the roof rail. Thus, a low-cost roof rail can be provided enjoying an excellent appearance and good handleability.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A roof rail structure for a motor vehicle having a roof groove formed in a roof panel along an entire side length thereof adjacent a side panel in a longitudinal direction of said motor vehicle, comprising:

a molding unit provided with a ridge for being inserted in the roof groove and with a cover section extending from the ridge for entirely covering the roof groove from above, legs protruding upwardly from an upper surface of the molding unit, and a rail body formed on the legs in parallel with the molding unit for supporting a roof carrier or luggage; and whereby the molding unit, legs, and the rail body are integrally formed of a synthetic resin.

2. The roof rail structure according to claim 1, wherein said legs include an end leg at a front end and a rear end of the rail body and an intermediate leg between the end legs, the upper end portion of said intermediate leg being narrower than the lower surface of the rail body so that a hook portion for a roof carrier mounting clamp can attach on the lower surface of the rail body on each side of the upper end of the intermediate leg.

3. The roof rail structure according to claim 2, wherein said intermediate leg is continuously formed without a gap between the front end leg and the rear end leg.

4. The roof rail structure according to claim 1, wherein said legs include an end leg at a front end and a rear end of the rail body and an intermediate leg arranged between the end legs, opposite side faces of said intermediate leg being continuous and flush with a bottom portion of the rail body and an upper surface of the molding unit.

5. The roof rail structure according to claim 1, wherein said molding unit includes a cover section adapted to continuously cover the top of the roof groove and a ridge protruding downward from the lower surface of the cover section and adapted to be fitted tight in the roof groove, the ridge having the respective heads of a plurality of fixing bolts embedded in the bottom portion thereof at intervals so that the bolts project downward from the underside of the ridge, whereby the roof rail can be attached to the roof groove by inserting the fixing bolts individually into mounting holes in the base of the groove and tightening the bolts by means of nuts from the inside of the vehicle.

6. The roof rail structure according to claim 1, wherein said molding unit includes a cover section adapted to continuously cover the top of the roof groove and a bulge projecting downward from the lower surface of the cover section, the bulge having a longitudinal retaining groove cut individually in the opposite side faces thereof, whereby the roof rail can be attached to the roof groove by fitting a flange portion of a metallic bracket individually into the retaining grooves so that the bracket is attached to the bulge for longitudinal sliding motion, inserting fixing bolts, fixed to the bracket, individually into mounting holes in the base of the groove, and tightening the bolts with nuts from the inside of the vehicle, the bracket being a substantially channel-shaped structure including a base, a pair of side faces, and engaging flange portions formed by inwardly bending the respective upper portions of the side faces, the fixing bolts being fixed to the base of the bracket so as to project downward therefrom.

7. A roof rail structure for motor vehicles having a roof groove extending in a longitudinal direction of a vehicle body along each side of a roof panel of the vehicle comprising:

a molding unit adapted to be attached to the roof grooves, a plurality of legs extending upward from an upper surface of the molding unit, and a rail body formed on the plurality of legs for supporting luggage on the roof panel of the vehicle;

wherein said molding unit includes a cover section adapted to continuously cover the top of the roof grove and a ridge protruding downward from the lower surface of the cover section and adapted to be fitted tight in the roof grove, the ridge having the respective heads of a plurality of fixing bolts embedded in the bottom portion thereof at intervals so that the bolts project downward from the underside of the ridge, whereby the roof rail can be attached to the roof groove by inserting the fixing bolts individually into mounting holes in the base of the groove and tightening the bolts with nuts from the inside of the vehicle; and whereby the molding unit, the plurality of legs, and the rail body are integrally formed from a synthetic resin.

8. A roof rail structure for motor vehicles having a roof groove extending in a longitudinal direction of a vehicle body along each side of a roof panel of the vehicle comprising:

a molding unit adapted to be attached to the roof grooves, a plurality of legs extending upward from an upper surface of the molding unit, and a rail body formed on the plurality of legs for supporting luggage on the roof panel of the vehicle;

wherein said molding unit includes a cover section adapted to continuously cover the top of the roof groove and a bulge projecting downward from the lower surface of the cover section, the bulge having a longitudinal retaining groove cut individually in the opposite side faces thereof, whereby the roof rail can be attached to the roof groove by fitting a flange portion of a metallic bracket individually into the retaining grooves so that the bracket is attached to the bulge for longitudinal sliding motion, inserting fixing bolts, fixed to the bracket, individually into mounting holes in the base of the groove, and tightening the bolts with nuts from the inside of the vehicle, the bracket being a substantially channel-shaped structure including a base, a pair of side faces, and engaging flange portions formed by inwardly bending the respective upper portions of the side faces, the fixing bolts being fixed to the base of the bracket so as to project downward therefrom; and whereby the molding unit, the plurality of legs, and the rail body are integrally formed from a synthetic resin.

* * * * *